(12) United States Patent
Liu

(10) Patent No.: US 11,607,964 B2
(45) Date of Patent: Mar. 21, 2023

(54) CHARGING PILE FOR SWEEPING ROBOT

(71) Applicant: Shenzhen Shermon Technology Co., Limited, Shenzhen (CN)

(72) Inventor: Shangliu Liu, Shenzhen (CN)

(73) Assignee: Shenzhen Shermon Technology Co., Limited, Shenzhen (CN)

( * ) Notice: Subject to any disclaimer, the term of this patent is extended or adjusted under 35 U.S.C. 154(b) by 184 days.

(21) Appl. No.: 17/129,949

(22) Filed: Dec. 22, 2020

(65) Prior Publication Data

US 2022/0161671 A1    May 26, 2022

(30) Foreign Application Priority Data

Nov. 24, 2020 (CN) .......................... 202022752180.2

(51) Int. Cl.
*B60L 53/18*    (2019.01)
*H02J 7/00*    (2006.01)
*A47L 11/40*    (2006.01)
*A47L 11/24*    (2006.01)

(52) U.S. Cl.
CPC .............. *B60L 53/18* (2019.02); *A47L 11/24* (2013.01); *A47L 11/4005* (2013.01); *H02J 7/0042* (2013.01); *A47L 2201/022* (2013.01)

(58) Field of Classification Search
CPC ................. B60L 53/18; A47L 11/24
USPC ......................................................... 320/109
See application file for complete search history.

(56) References Cited

U.S. PATENT DOCUMENTS

| 10,610,073 | B1* | 4/2020 | Lucas .................. A47L 11/4005 |
| 11,348,269 | B1* | 5/2022 | Ebrahimi Afrouzi ........................ G01S 7/4804 |
| 2014/0184144 | A1* | 7/2014 | Henricksen ........... H02J 7/0044 34/104 |
| 2022/0066456 | A1* | 3/2022 | Ebrahimi Afrouzi ........................ B25J 9/1697 |

* cited by examiner

Primary Examiner — Suchin Parihar

(57) ABSTRACT

A charging pile for sweeping robot including a main body, a storage component, a charging head, a charging cable, and a circuit board. The main body is provided with a first slot. The storage component, provided with a charging interface and an avoidance slot. The charging pile for sweeping robot includes a first mounting post movably connected to the main body. The charging cable is partly wound on the first mounting post, one end of which is detachably connected to the charging interface, and the other surrounds the first mounting post and penetrates through the avoidance slot and is fixedly connected to the charging head. The charging interface is electrically connected to the main body, so the charging cable can be wound on the first mounting post and contained in the first slot, prevented from being scattered on ground, and making the charging pile more beautiful when in use.

9 Claims, 5 Drawing Sheets

CHARGING PILE FOR SWEEPING ROBOT

CROSS-REFERENCE TO RELATED APPLICATIONS

This application claims priority to Chinese Patent Application No. 202022752180.2 filed Nov. 24, 2020, the contents of which are incorporated herein by reference.

BACKGROUND

1. Technical Field

The present invention relates to a field of sweeping robot, especially to a charging pile for sweeping robot.

2. Description of Related Art

Sweeping robots often need to be charged through charging piles when they are out of power. In order to make the sockets on the wall with different heights electrically connected with the charging head, manufacturers often make the charging cable very long. However, for a user whose wall socket is not high from the ground, when using the charging pile, the charging cable will be scattered on the ground, which will give the user an unsightly feeling. At the same time, the scattered cable on the ground will make the sweeping robot unable to clean the area where the charging cable is scattered, thus affecting the use.

DETAILED DESCRIPTION

The present application will be further described below with reference to the accompanying drawings for further clearly and fully discussing the technical solutions of the present invention.

Figure 1:
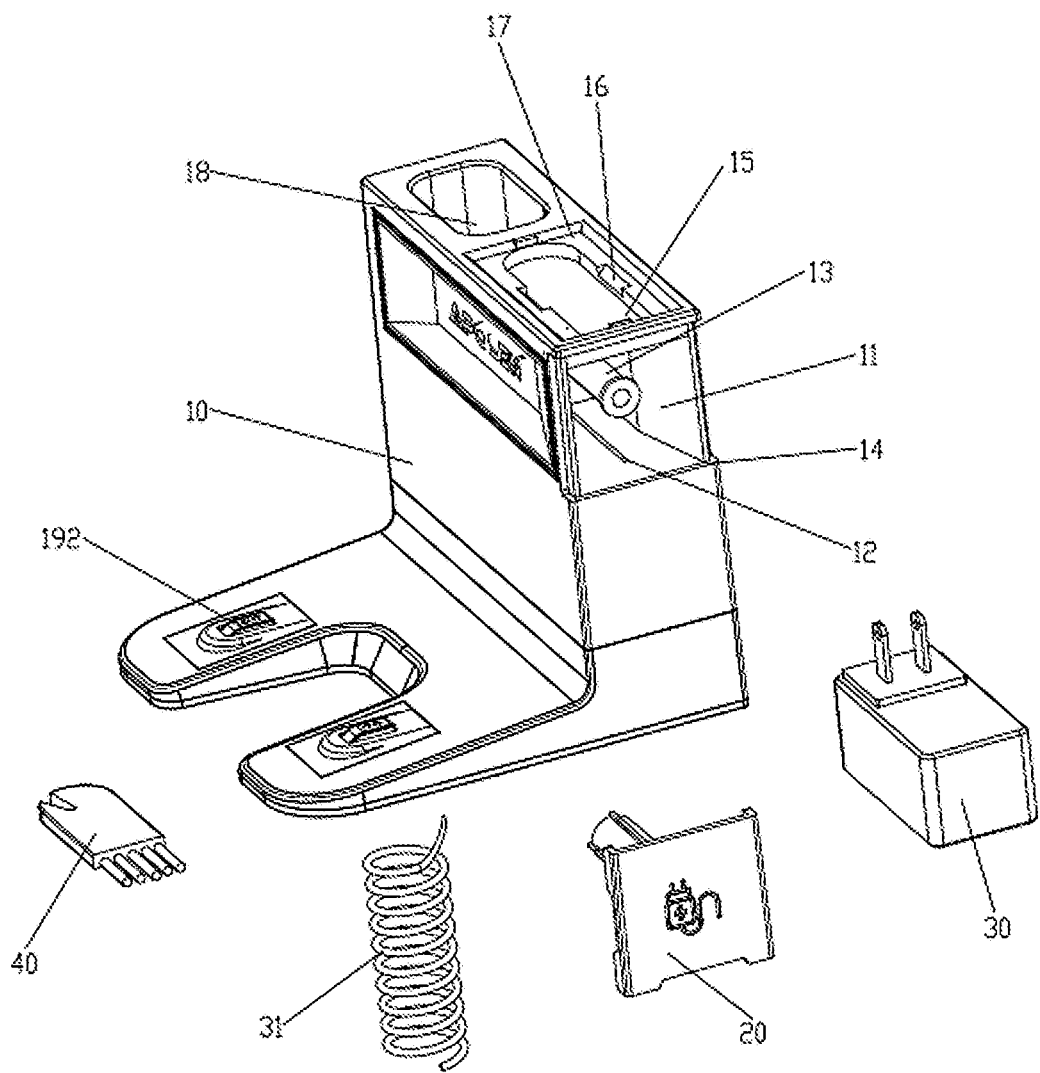
FIG. 1 shows an exploded view of the charging pile for sweeping robot according to the present application.
Figure 2:
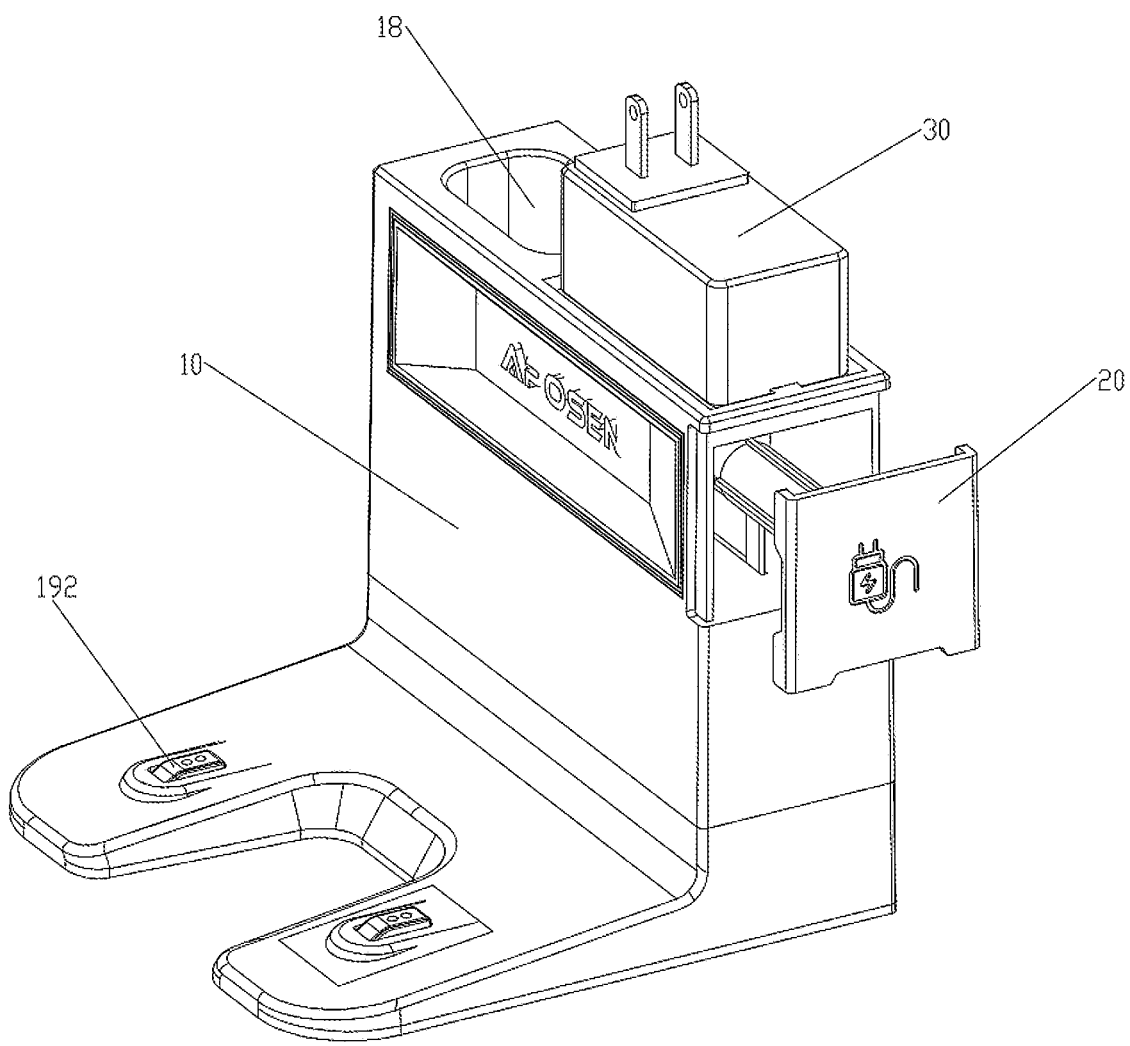
FIG. 2 shows a perspective view of the charging pile for sweeping robot according to the present application.
Figure 3:
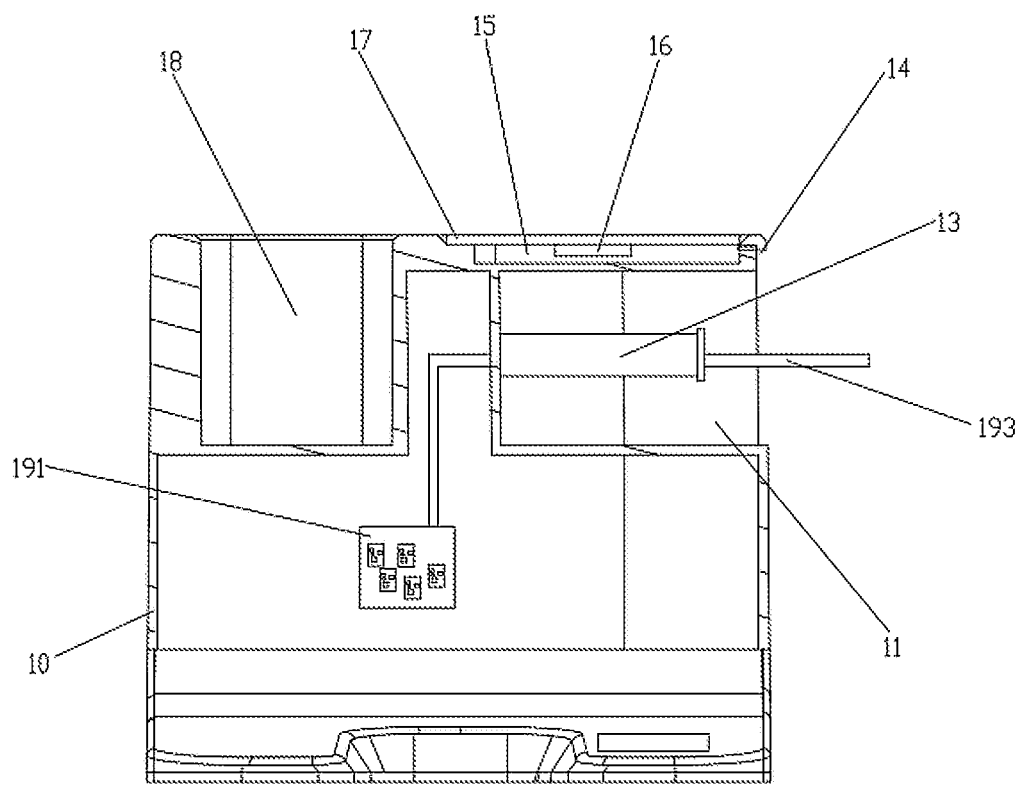
FIG. 3 shows a schematic view of the internal structure of the charging pile for sweeping robot according to the present application.
Figure 4:
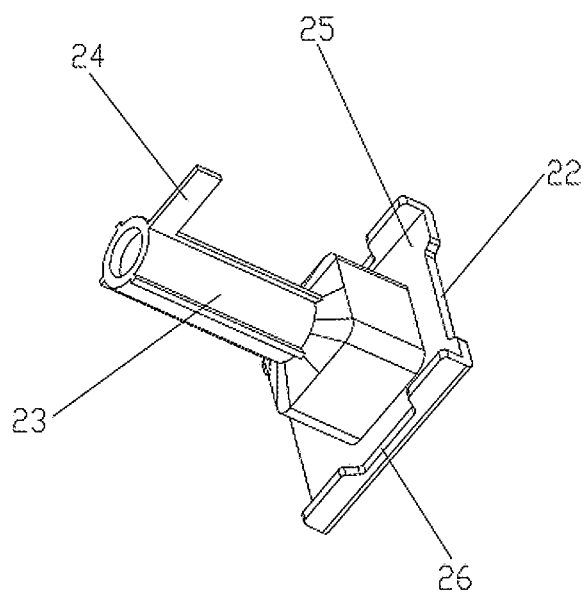
FIG. 4 shows a perspective view of the storage component according to the present application.
Figure 5:
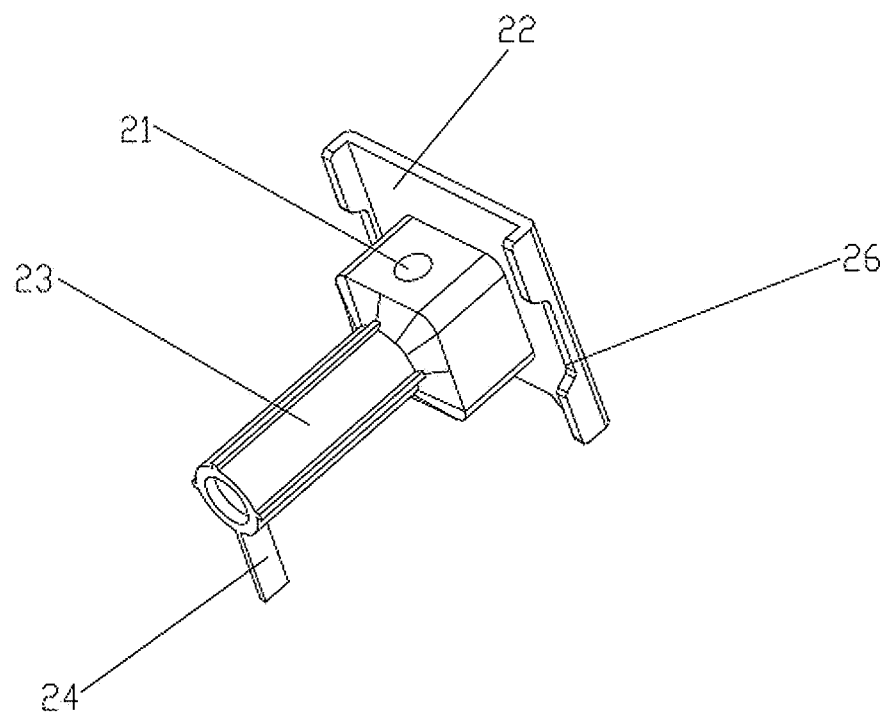
FIG. 5 shows another perspective view from another angle of the storage component according to the present application.

With reference to FIGS. 1 to 5, a charging pile for sweeping robot is provided in the present application, including a main body 10, a storage component 20, a charging head 30, a charging cable 31, and a circuit board 191. The main body 10 is provided with a first slot 11. The storage component 20 is provided with a charging interface 21 and an avoidance slot 22. The charging pile for sweeping robot includes a first mounting post 23 fixedly connected to the storage component 20. The avoidance slot 22 and the first slot 11 are connected. The first mounting post 23 is movably connected to the main body 10, and the storage component 20 could be movably contained in the first slot 11 by sliding the first mounting post 23. The charging cable 31 is partly wound on the first mounting post 23. One end of the charging cable 31 is detachably connected to the charging interface 21, and the other end of the charging cable 31 extends through the avoidance slot 22 to the outside of the main body 10 and is fixedly connected to the charging head 30. The charging interface 21 is electrically connected to the circuit board 191. The circuit board 191 is fixedly contained in the main body 10.

In the present embodiment, the charging interface 21 is electrically connected to the main body 10. One end of the charging cable 31 is electrically connected to the charging interface 21, and the other end of the charging cable 31 is electrically connected to the charging head 30. When the charging head 30 is connected to an external power source, the charging head 30 can supply power to the main body 10 sequentially through the charging cable 31 and the charging interface 21. The charging cable 31 is partly wound on the first mounting post 23. One end of the charging cable 31 is detachably connected to the charging interface 21, and the other end of the charging cable 31 penetrates the avoidance slot 22 and extends to the outside of the main body 10 and is fixedly connected to the charging head 30. The main body 10 further includes a circuit board 191, which is fixedly contained in the main body 10. The charging interface 21 is electrically connected to the circuit board 191 so that the charging cable 31 can be wound around the first mounting post 23 and contained in the first slot 11, so as to prevent the charging cable 31 from being scattered on the ground, and make the charging pile for the sweeping robot more beautiful during use.

Further, the main body 10 is further provided with a limiting slot 12. The storage component 20 further includes a limiting plate 24 fixedly connected to the first mounting post 23. The limiting slot 12 is connected to the first slot 11. The limiting plate 24 is contained in the first slot 11 and partly extends into the limiting slot 12.

In the present embodiment, the main body 10 is further provided with a limiting slot 12. The limiting plate 24 is contained in the first slot 11 and partly extends into the limiting slot 12. The limiting plate 24 can make the first mounting post 23 slide better, and the redundant part of the charging cable 31 is stored in the first slot 11, so as to prevent the charging cable 31 from being scattered on the ground, and make the charging pile for the sweeping robot more beautiful during use. At the same time, the cleaning area of the sweeping robot is larger when cleaning.

Further, the charging pile for sweeping robot further includes a second mounting post 13 fixedly connected to the main body 10. The second mounting post 13 is movably contained in the first mounting post 23, and the second mounting post 13 is connected to the first mounting post 23.

In the present embodiment, the charging pile for sweeping robot further includes a second mounting post 13 fixedly connected to the main body 10. The second mounting post 13 is movably contained in the first mounting post 23 and is connected to the first mounting column 23, so that the charging cable 31 surrounds the first mounting column 23. The first mounting column 23 can slide relative to the second mounting column 13, thereby the storage component 20 can be contained in the first slot 11, and finally the redundant part of the charging cable 31 is contained in the first slot 11 to prevent the charging cable 31 from being scattered on the ground. The charging pile for sweeping robot is more beautiful during use, and at the same time, the cleaning area of the sweeping robot is larger.

Further, the charging pile for sweeping robot further includes a baffle 25 fixedly connected to the storage component 20. The baffle 25 is far away from the first mounting post 23. The avoidance slot 22 is located on the baffle 25. The main body 10 is also provided with a groove 14 connected with the first slot 11. The baffle 25 is movably contained in the groove 14 and shields the groove 14. The groove 14 is connected to the avoidance slot 22. Two second slots 26 are provided on the baffle 25 symmetrically.

In the present embodiment, the charging pile for sweeping robot further includes a baffle 25 fixedly connected to the storage component 20. The baffle 25 is far away from the first mounting post 23. The avoidance slot 22 is located on the baffle 25. The main body 10 is also provided with a groove 14 connected to the first slot 11. The baffle 25 is movably contained in the groove 14 and shields the groove 14. The groove 14 is connected to the avoidance slot 22. And two second slots 26 are symmetrically provided on the baffle plate 25. The baffle plate 25 is easier to be taken out from the groove 14 through the two second slots 26. The baffle 25 is movably contained in the groove 14 and shields the groove 14, so that the charging pile for sweeping robot can give the user a better visual experience.

Further, the charging pile for sweeping robot further includes a cleaning brush 40. The main body 10 is further provided with a third slot 15. The cleaning brush 40 is movably contained in the third slot 15. The main body 10 is further provided with a chute connected to the third slot 15.

In the present embodiment, the charging pile for sweeping robot further includes a cleaning brush 40. The main body 10 is further provided with a third groove 15. The cleaning brush 40 is movably contained in the third slot 15. The main body 10 is further provided with a chute 16 connected to the third slot 15. The cleaning brush 40 can clean the sweeping robot, and the cleaning brush 40 is movably contained in the third slot 15 to facilitate the storage of the brush 40. The chute 16 facilitates the access of the cleaning brush 40.

Further, the main body 10 is further provided with a fourth slot 17 connected to the third slot 15. The charging head 30 is movably contained in the fourth slot 17.

In the present embodiment, the charging head 30 is movably contained in the fourth slot 17. When not in use, the charging head 30 can be movably contained in the fourth slot 17, which is convenient for the charging head 30 to storage.

Further, the main body 10 is also provided with a placing slot 18.

In this embodiment, the main body 10 is further provided with a placing slot 18, which is convenient for storing the remote of the sweeping robot.

Further, the charging pile for sweeping robot further includes an electrical contact block 192 fixedly connected to the main body 10. The electrical contact block 192 is electrically connected to the circuit board 191. The main body 10 is also provided with a connecting wire 193. One end of the connecting wire 193 is electrically connected to the charging interface 21, and the other end of the connecting wire 193 sequentially penetrates the first mounting post 23 and the second mounting post 13 and is electrically connected to the circuit board 191.

In the present embodiment, the main body 10 is also provided with a connecting wire 193. One end of the connecting wire 193 is electrically connected to the charging interface 21, and the other end of the connecting wire 193 sequentially penetrates the first mounting post 23 and the second mounting post 13 and is electrically connected to the circuit board 191. The charging pile for sweeping robot further includes an electrical contact block 192 fixedly connected to the main body 10. The electrical contact block 192 is electrically connected to the circuit board 191. The circuit board 191 controls the discharge of the electrical contact block 192, and the charging interface 21 can be electrically connected to the circuit board 191 through the connecting wire 193.

In the present embodiment, when in use, the storage component 20 is taken out from the first slot 11 through the second slot 26. The first mounting post 23 slides relative to the second mounting post 13. One end of the charging cable 31 is fixedly connected to the charging interface 21, and the other end of the charging cable 31 surrounds the first mounting post 23 and penetrates the avoidance slot 22 to be fixedly connected to the charging head 30. Pushing the baffle 25 allows the first mounting post 23 to slide in a direction close to the second mounting post 13, so that the storage component 20 is contained in the first slot 11 to prevent the charging cable 31 from being scattered on the ground. The charging pile for sweeping robot is more beautiful, and the cleaning area of the sweeping robot is larger when cleaning. The charging head 30 is electrically connected to the external power source, and the charging head 30 is sequentially electrically connected to the electric contact block 192 through the charging cable 31, the charging interface 21, the connecting wire 193 and the circuit board 191, to supply power for the sweeping robot.

It should be noted that the present application may have other various embodiments. Modifications and variations made by those skilled in the art based on the embodiments according to the present application without any creative work also fall within the scope of the present application.

What is claimed is:

1. A charging pile for sweeping robot, comprising
   a main body provided with a first slot;
   a storage component provided with a charging interface and an avoidance slot in communication with the first slot, wherein the charging pile for sweeping robot comprises a first mounting post fixedly connected to the storage component, and the first mounting post is movably connected to the main body;
   a charging head;
   a charging cable partly wound on the first mounting post, wherein one end of the charging cable is detachably connected to the charging interface, and the other end of the charging cable extends through the avoidance slot to the outside of the main body and is fixedly connected to the charging head;
   a circuit board fixedly contained in the main body, wherein the charging interface is electrically connected to the circuit board; and
   a second mounting post fixedly connected to the main body, wherein the second mounting post is received in the first slot and movably contained in the first mounting post, and the first mounting post is slidable with respect to the second mounting post, the storage component is movably received in the first slot by sliding of the first mounting post with respect to the second mounting post.

2. The charging pile for sweeping robot according to claim 1, wherein the main body is further provided with a limiting slot, and the storage component further comprises a limiting plate fixedly connected to the first mounting post, wherein the limiting slot is connected to the first slot, and the limiting plate is contained in the first slot and partly extends into the limiting slot.

3. The charging pile for sweeping robot according to claim 1, wherein the charging pile for sweeping robot further comprises a baffle fixedly connected to the storage component, and the baffle is far away from the first mounting post, the avoidance slot being located on the baffle, and wherein the main body is further provided with a groove connected with the first slot and the avoidance slot, the baffle movably contained in the groove and shielding the groove.

4. The charging pile for sweeping robot according to claim 3, wherein two second slots are provided on the baffle symmetrically.

5. The charging pile for sweeping robot according to claim 1, wherein the charging pile for sweeping robot further comprises a cleaning brush, and the main body is further provided with a third slot and a chute connected to the third slot, wherein the cleaning brush is movably contained in the third slot.

6. The charging pile for sweeping robot according to claim 5, wherein the main body is further provided with a fourth slot connected to the third slot, and the charging head is movably contained in the fourth slot.

7. The charging pile for sweeping robot according to claim 1, wherein the main body is further provided with a placing slot.

8. The charging pile for sweeping robot according to claim 1, wherein the charging pile for sweeping robot further comprises an electrical contact block fixedly connected to the main body, and the electrical contact block is electrically connected to the circuit board.

9. The charging pile for sweeping robot according to claim 1, wherein the main body is further provided with a connecting wire, wherein one end of the connecting wire is electrically connected to the charging interface, and the other end of the connecting wire sequentially penetrates the first mounting post and the second mounting post and is electrically connected to the circuit board.

* * * * *